United States Patent
Gayot et al.

(10) Patent No.: US 10,497,973 B2
(45) Date of Patent: Dec. 3, 2019

(54) POLYMER COMPOSITIONS THAT CONDUCT LITHIUM IONS FOR ELECTROCHEMICAL LITHIUM GENERATOR

(71) Applicant: COMMISSARIAT À L'ÉNERGIE ATOMIQUE ET AUX ÉNERGIES ALTERNATIVES, Paris (FR)

(72) Inventors: Charles Gayot, Ploermel (FR); Jessica Charoloy, Grenoble (FR); Gérard Gebel, Saint Egreve (FR); Sophie Mailley, Le Pin (FR); Lionel Picard, Seyssinet Pariset (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 612 days.

(21) Appl. No.: 15/023,422

(22) PCT Filed: Sep. 23, 2014

(86) PCT No.: PCT/EP2014/070196
§ 371 (c)(1),
(2) Date: Mar. 21, 2016

(87) PCT Pub. No.: WO2015/044113
PCT Pub. Date: Apr. 2, 2015

(65) Prior Publication Data
US 2016/0211549 A1    Jul. 21, 2016

(30) Foreign Application Priority Data
Sep. 26, 2013 (FR) ..................... 13 59283

(51) Int. Cl.
*H01M 10/0565* (2010.01)
*H01M 10/052* (2010.01)
(Continued)

(52) U.S. Cl.
CPC ....... *H01M 10/0565* (2013.01); *H01M 6/181* (2013.01); *H01M 10/052* (2013.01);
(Continued)

(58) Field of Classification Search
CPC ........... H01M 10/0565; H01M 10/052; H01M 10/056; H01M 6/181; H01M 12/06; H01M 12/08; H01M 8/1041
See application file for complete search history.

(56) References Cited

U.S. PATENT DOCUMENTS

2001/0020084 A1*  9/2001  Aoki ................... C08G 65/332
                                                    528/392
2012/0183880 A1   7/2012  Toussaint et al.
2015/0125762 A1   5/2015  Gayot et al.

FOREIGN PATENT DOCUMENTS

EP     2450985 A1   5/2012
EP     2483964 A1   8/2012
(Continued)

OTHER PUBLICATIONS

JP 4300954, English Translation via JPO (Year: 2009).*
(Continued)

*Primary Examiner* — Jimmy Vo
(74) *Attorney, Agent, or Firm* — Pearne & Gordon LLP

(57) ABSTRACT

The invention relates to polymer compositions that conduct lithium ions including the following ingredients: at least one ionic polymer from the polymerization of an ionic liquid, the cation of which bears at least one polymerizable function; at least one lithium salt; and at least one non-ionic polymer, the composition being a solid composition, i.e., a composition devoid of water and organic solvent(s). The invention also relates to the use of the polymer compositions for entering into the formation of electrolytic membranes of electrochemical lithium generators.

24 Claims, 5 Drawing Sheets

(51) Int. Cl.
  *H01M 12/06* (2006.01)
  *H01M 10/056* (2010.01)
  *H01M 12/08* (2006.01)
  *H01M 6/18* (2006.01)
  *H01M 8/1041* (2016.01)

(52) U.S. Cl.
  CPC ......... *H01M 10/056* (2013.01); *H01M 12/06* (2013.01); *H01M 12/08* (2013.01); *H01M 6/18* (2013.01); *H01M 8/1041* (2013.01); *H01M 2300/0065* (2013.01); *H01M 2300/0082* (2013.01); *H01M 2300/0091* (2013.01); *Y02E 60/128* (2013.01)

(56) References Cited

FOREIGN PATENT DOCUMENTS

FR     2941091 A1     7/2010
JP     4300954 B2 *   7/2009

OTHER PUBLICATIONS

Hasegawa, S., et al., "Study on lithium/air secondary batteries—Stability of NASICON-type lithium ion conducting glass-ceramics with water", Journal of Power Sources, Aug. 14, 2008, pp. 371-377, vol. 189.

Read, J., "Ether-Based Electrolytes for the Lithium/Oxygen Organic Electrolyte Battery", Journal of the Electrochemical Society, Dec. 2, 2005, pp. A96-A100, vol. 153, No. 1.

\* cited by examiner

POLYMER COMPOSITIONS THAT CONDUCT LITHIUM IONS FOR ELECTROCHEMICAL LITHIUM GENERATOR

CROSS-REFERENCE TO RELATED APPLICATIONS

This application is a U.S. national phase under the provisions of 35 U.S.C. § 371 of International Patent Application No. PCT/EP14/70196 filed Sep. 23, 2014, which in turn claims priority of French Patent Application No. 1359283 filed Sep. 26, 2013. The disclosures of such international patent application and French priority patent application are hereby incorporated herein by reference in their respective entireties, for all purposes.

The present invention relates to polymer compositions that conduct lithium ions based on an original association of ingredients.

Due to their ability to conduct lithium ions, it is consequently thus quite natural that these compositions can find application in the field of electrolytes, and particularly electrolytes intended for entering into the formation of electrochemical lithium generators, and more particularly:
  accumulators designed to be recharged, such as lithium-ion batteries, lithium-metal batteries (more specifically, lithium-sulphur batteries, lithium-air batteries); or
  primary cell batteries based on lithium (such as $V_2O_5/Li$ cell batteries and $Li/SOCl_2$ cell batteries).

Lithium accumulators are particularly interesting for fields where autonomy is a vital criterion, as is the case in the fields of computing, video, mobile telephony, transports such as electric vehicles, hybrid vehicles, or instead the medical, space, microelectronics fields.

Lithium-metal batteries conventionally comprise at least one electrochemical cell, composed of the following elements:
  a negative electrode based on lithium metal;
  a positive electrode based on a compound capable of intercalating the lithium; and
  an electrolytic membrane (also being able to be designated electrolytic core) arranged between said negative electrode and said positive electrode.

Apart from its role of physical separation between the two aforementioned electrodes, the electrolytic membrane also assures the conduction of lithium ions between the negative electrode and the positive electrode during discharge processes and the conduction of lithium ions between the positive electrode and the negative electrode during discharge processes.

To do so, the electrolytic membrane is, conventionally in the form of a separator impregnated with an ion conducting liquid electrolyte, and more specifically, a liquid electrolyte comprising one or more lithium salts. Essentially two types of technologies exist concerning separators:
  porous separators, in which the electrolyte is located in the porosity of the separators;
  gel separators, in which the electrolyte spreads out the macromolecular chains of the gel, in order to move between them.

Nevertheless, although the lithium metal used as constituent of negative electrodes makes it possible to obtain a high nominal cell voltage and excellent mass and volume energy densities, it may prove to be harmful during cycling processes of the accumulators. In fact, during cycling processes, the lithium metal is alternatively expulsed, in the form of ions, during discharges, and redeposited, during charges on the negative electrode. At the end of a certain number of cycles, lithium dendrites can form, which, on the one hand, can contribute to denaturing the physical integrity of the membrane and, on the other hand, can lead to a short-circuit phenomenon, when the dendrites physically connect the negative electrode to the positive electrode, which results in a substantial rise in the temperature of the battery and its irreversible degradation.

Concerning lithium-air batteries, such batteries are conventionally composed, at the level of each basic electrochemical cell, of a negative electrode formed of a lithium based material, which may be either lithium metal or a lithium based alloy, as specified in FR 2,941,091, and a positive electrode of the air electrode type separated by a lithium ion conducting electrolyte.

The operation of an electrochemical cell of a lithium-air battery with organic electrolyte is based, more precisely, on a reduction of oxygen at the positive electrode by the $Li^+$ ions present in the electrolyte and coming from the negative electrode and on an oxidation of lithium metal at the negative electrode, during the discharge process, the reactions taking place at the electrodes being able to be symbolised by the following electrochemical equations:
  at the positive electrode (air electrode):

$$2Li^+ + 2e^- + O_{2(g)} \rightarrow Li_2O_2(s) \quad (2.91\ V\ vs\ Li^+/Li)$$

$$2Li^+ + 2e^- + (\tfrac{1}{2})O_2(g) \rightarrow Li_2O(s) \quad (3.10\ V\ vs\ Li^+/Li)$$

*at the negative electrode:

$$Li_{(s)} \rightarrow Li^+ + e^-$$

During the use of an aqueous electrolyte, the electrochemical equations illustrating the system are the following:
  *at the positive electrode (air electrode):

$$O_2 + 2H_2O + 4e^- \rightarrow 4OH^- \quad (3.45\ V\ vs\ Li^+/Li)$$

*at the negative electrode:

$$Li_{(s)} \rightarrow Li^+ + e^-$$

The positive electrode and the negative electrode are separated by a membrane assuring, apart from physical separation, the conduction of lithium ions, through the presence within this membrane of a lithium ion conducting electrolyte, which may be an organic liquid electrolyte (as described in the *Journal of the Electrochemical Society*, 153 (2006), 96-100) or an aqueous liquid electrolyte (as described in the Journal of Power Sources, 189 (2009), 371-377).

The main obstacles of lithium-air technology, notably when the electrolyte is an aqueous electrolyte, are the following:
  the safety of the accumulator; and
  the reversibility of the electrochemical reactions at the electrodes.

In fact, concerning battery safety, this ensues essentially from the use of lithium metal or lithium alloy at the negative electrode, which, during the discharge process, migrates and reacts with oxygen to form lithium peroxide or LiOH (depending on the nature of the electrolyte) and, during the charge process, may be behind the creation of lithium dendrites.

These lithium dendrites generate the following drawbacks:
  they can short-circuit the battery and thus place the user in danger;
  they can contribute, also, to considerably reducing the cyclability of the battery, from the moment that the electrical contact between the lithium and the adjacent current collector increasingly worsens, as the number of cycles increases; and they can contribute to ineluctably damaging the negative electrode, which leads to a consequent limitation of the cyclability of the battery (said cyclability being able to be limited to around 50 cycles, which does not enable prolonged use of the system).

Concerning the reversibility of the electrochemical reactions at the electrodes, particularly in the case of organic or aqueous electrolytes, it should be noted that insoluble discharge products, such as $Li_2O_2$ or $Li_2O$, are caused to deposit in the porosity of the air electrode, compromising the reversibility of the reactions due to the increase in the internal resistance and, consequently, the cycling stability of the battery.

In order to try to overcome these drawbacks, it has been proposed to protect the negative electrode from direct contact with the electrolyte by depositing on the surface thereof a protective layer, of a thickness of at least 200 μm (particularly for reasons of processability), made of lithium ion conducting ceramic (as described in EP 2483964), which has the advantage of offering a good physical barrier to water. Nevertheless, the use of such a layer may have the following drawbacks:

at the end of a certain number of cycles, it can decompose, when the electrolyte is an alkaline electrolyte of pH above 10;

the relatively high thickness of the protective layer contributes to increasing the resistivity thereof, thus not allowing the battery to be used at too high rates; and by virtue of its chemical nature (ceramic), the protective layer has a brittle character, making handling difficult and imposes a minimum thickness, typically, of the order of 200 μm.

The possible deterioration of the membrane has as a consequence a drastic reduction in the conductivity of said membrane over time. What is more, the membrane, over time, becomes permeable to the aqueous electrolyte, which can thus enter into contact with the negative electrode and cause its inflammation.

Thus, whether for lithium-metal type or lithium-air type batteries, there remains a need to find a solution to overcome the aforementioned drawbacks linked to the use of an aqueous liquid electrolyte with a negative electrode based on lithium metal.

DESCRIPTION OF THE INVENTION

The authors of the present invention have developed an innovative composition intended to be applied to a negative electrode of an electrochemical lithium generator, such as a lithium accumulator, with a view to providing a solution to the aforementioned problem.

This composition is a polymer composition that conducts lithium ions including the following ingredients:

at least one ionic polymer from the polymerisation of an ionic liquid, the cation of which bears at least one polymerisable group;

at least one lithium salt; and at least one non-ionic polymer.

More specifically, in view of the aforementioned ingredients, said composition is a solid composition, i.e. devoid of water and organic solvent(s), which makes it possible to avoid the drawbacks linked to the use of water and organic solvent(s) when said compositions are intended to form membranes in contact with lithium metal.

By virtue of the association of these ingredients, the compositions of the invention are capable of forming a polymer membrane having the following properties:

a membrane that conducts lithium ions due, particularly, to the combination of the aforementioned ionic polymer and lithium salt;

a mechanically, chemically and electrochemically stable membrane, when it is brought into contact with lithium metal;

a membrane stable vis-à-vis aqueous electrolytes, whether they are basic (for example, containing LiOH) or acidic (for example, containing acetic acid or phosphoric acid) and, more particularly, vis-à-vis electrolytes even concentrated with lithium salts in a range of temperatures representative of the end use.

The function of the lithium salt is to provide lithium ions to the composition, thus conferring to it ionic conduction to lithium ions.

Said lithium salt may be selected from the group constituted of $LiPF_6$, $LiClO_4$, $LiBF_4$, $LiAsF_6$, $LiCF_3SO_3$, lithium bis(trifluoromethanesulfonyl)imide (known by the abbreviation LiTFSI) $LiN[SO_2CF_3]_2$, bis(pentafluoroethanesulfonyl)imide $LiN(C_2F_5SO_2)_2$ (known by the abbreviation LiBETI) and mixtures thereof, the preference being for LiTFSI and LiBETI.

The lithium salt may be present, in the composition, according to a concentration ranging from 0.05 M to 5M, for example, from 1M to 2M.

The lithium salt, by virtue of the chemical nature of its cation and/or anion, may have a hydrophobic character.

Within the composition, it is advantageously solvated by the ionic polymer, as defined above.

As mentioned above, the ionic polymer is a polymer from the polymerisation of an ionic liquid, the latter comprising a cation bearing at least one polymerisable group.

It is pointed out that ionic liquid is taken to mean salts in the liquid state, said ionic liquids being able to be represented by the following generic formula (I):

$$A^+X^- \qquad (I)$$

in which:

$A^+$ represents a cation, generally, organic; and $X^-$ represents an anion.

In the case of the invention, the cation is an organic cation bearing at least one polymerisable function, namely a function capable of polymerising to form a polymer resulting from a sequencing of repeating units from the polymerisation of said polymerisable group.

Preferably, said polymerisable function is a function polymerisable by radical pathway, such a function being able to be advantageously a function bearing an unsaturation, such as a vinylic group and, more specifically, a methacrylate group.

Such a cation may be symbolised by the generic formula:

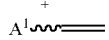

a single unsaturated function being represented here by the double bond ═. The wavy bond represents a covalent bond connecting a carbon atom of the double bond to the group $A^1$. It is not excluded that other groups can be bound to the carbon atoms of the double bond, the simplification bias here having consisted in only representing the group $A^1$.

The cation may be a compound comprising at least one nitrogen atom, at least one phosphorous atom or at least one sulphur atom, the positive charge of which is borne by said nitrogen atom, said phosphorous atom or said sulphur atom, said nitrogen, phosphorous or sulphur atom being able to belong to a linear or branched hydrocarbon chain or to a hydrocarbon ring.

In particular, the cation may be a compound comprising at least one nitrogen atom, the positive charge of which is borne by said nitrogen atom, said nitrogen atom being able to belong to a linear or branched hydrocarbon chain or to a hydrocarbon ring.

When the positively charged nitrogen atom belongs to a linear or branched hydrocarbon chain, the cation may be an aliphatic ammonium cation and, more specifically, may respond to the following generic formula (II):

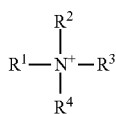

(II)

in which $R^1$, $R^2$, $R^3$ and $R^4$ represent, independently of each other, a hydrocarbon group, with at least one of the groups $R^1$, $R^2$, $R^3$ and $R^4$ being a hydrocarbon group bearing at least one polymerisable function, such as that mentioned above.

When it is not a hydrocarbon group bearing at least one polymerisable function, the aforementioned hydrocarbon group may be an alkyl group including from 1 to 12 carbon atoms, potentially fluorinated.

Examples of such cations may be those of the following generic formulas (III) and (IV):

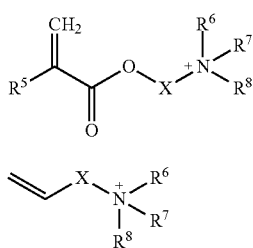

(III)

(IV)

in which:

$R^6$, $R^7$ and $R^8$ represent, independently of each other, an alkyl group, potentially fluorinated, including from 1 to 12 carbon atoms;

X represents an alkylene group, potentially fluorinated, including from 1 to 6 carbon atoms; and $R^5$ represents a hydrogen atom or a methyl group.

Specific examples falling within the scope of these formulas may be the specific compounds of following formulas (V) and (VI):

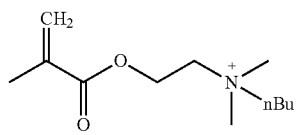

(V)

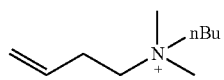

(VI)

the first compound being N,N,N,N-n-butyldimethylmethacryloyloxyethylammonium, nBu corresponding to the n-butyl group.

When the charged nitrogen atom belongs to a hydrocarbon ring, the cation may respond to one of the following formulas (VII) and (VIII):

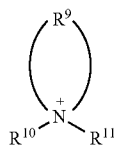

(VII)

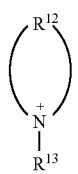

(VIII)

in which:

$N^+$ and $R^9$ together form an alicyclic group;

$N^+$ and $R^{12}$ together form an aromatic group;

$R^{10}$, $R^{11}$ and $R^{13}$ represent, independently of each other, a hydrocarbon group, with at least one of the groups $R^{10}$, $R^{11}$ and $R^{13}$ being a hydrocarbon group bearing at least one polymerisable function, such as that mentioned above.

Examples of cations of formula (VII) may be piperidinium cations, pyrrolidinium cations.

Specific examples of cations of formula (VIII) may be imidazolium cations, pyridinium cations.

Even more specifically, examples of cations may be those responding to the following formulas (IX) and (X):

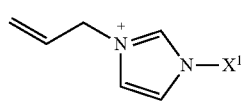

(IX)

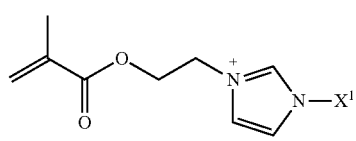

(X)

in which $X^1$ represents an alkyl group, potentially fluorinated, including from 1 to 6 carbon atoms.

Concerning the anion of the ionic liquid, it may be a compound including a heteroatom bearing a negative charge, said heteroatom being able to be selected from a nitrogen atom, a boron atom, a phosphorous atom or a chlorine atom.

More specifically, it may be:

an amide compound, in particular, perfluorinated, such as a bis(trifluoromethylsulfonyl)amide compound (also being able to be designated "bis(trifluoromethanesulfonyl)imide") of following formula (XI):

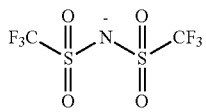

(XI)

a perfluorinated borate compound, such as a tetrafluoroborate compound of following formula (XII):

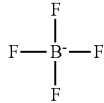

(XII)

a phosphate compound, such as a compound of formula $PF_6^-$; or a chlorinated compound, such as a chlorate compound of formula $ClO_4^-$.

A specific ionic liquid may be an ionic liquid resulting from the association:

of an aliphatic ammonium cation responding to the following generic formula (II):

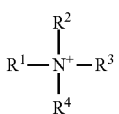

(II)

in which $R^1$, $R^2$, $R^3$ and $R^4$ represent, independently of each other, a hydrocarbon group, with at least one of the groups $R^1$, $R^2$, $R^3$ and $R^4$ being a hydrocarbon group bearing at least one polymerisable function, such as that mentioned above; and an amide anion, preferably, perfluorinated, a particular example of ionic liquid entering into this category being an ionic liquid resulting from the association:

of a cation of following formula (V):

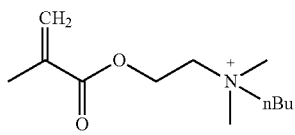

(V)

and of an anion of following formula (XI):

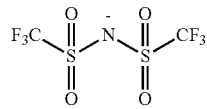

(XI)

Thus the ionic polymer from the polymerisation of such an ionic liquid may consist in a sequencing of a repeating unit of following formula (XIII):

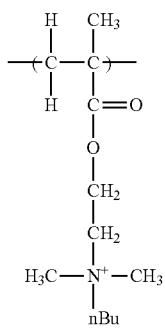

(XIII)

More generally, the ionic polymer from the polymerisation of an ionic liquid, of following simplified generic formula:

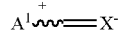

may be represented by the following simplified generic formula:

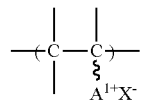

Moreover, the polymerisation of the ionic liquid necessary for the preparation of the ionic polymer may be carried out in the presence of one or more comonomers, with a view, notably, to modifying the glass transition temperature of the polymer obtained, to improving the ionic conductivity, to facilitating the implementation of the polymerisation and/or to modifying the hydrophobicity properties.

Examples of comonomers may be vinylic comonomers, such as methacrylate comonomers and styrenic comonomers.

Preferably, the polymerisable functions of the comonomer are of the same nature as those of the cation of the ionic liquid. In other words, when the cation of the ionic liquid comprises, for example, (meth)acrylate functions, the polymerisable functions of the comonomer are also, preferably, (meth)acrylate functions.

The ionic polymer has the ability of dissolving and/or dissociating the aforementioned lithium salt and to enable the conduction of said lithium ions.

Moreover, it may have hydrophobic character, particularly when it is desired that the composition constitutes a water barrier.

The ionic polymer may be comprised in the composition at a concentration ranging from 1 to 95% by weight compared to the total weight of the composition, preferably from 1 to 50% by weight and, even more preferably, from 10 to 50% by weight compared to the total weight of the composition.

Moreover, the composition includes, also apart from the aforementioned two ingredients, a non-ionic polymer.

This non-ionic polymer may contribute to assuring the mechanical strength of the composition and conferring on it flexibility and must, preferably, be chemically and electrochemically resistant to lithium metal, i.e. to be stable when it is in contact with lithium metal.

Preferably, it must not be reduced by lithium metal.

In fact, when it is wished that the composition is a water impermeable composition, the polymer must respect, preferably, the following conditions:
a water insoluble character;
a hydrophobic character; and
a chemical stability vis-à-vis an acidic or basic aqueous solution.

Finally, preferably, the non-ionic polymer has, advantageously, an implementation temperature at least above 50° C., the implementation temperature corresponding to the melting temperature in the case of highly crystalline semi-crystalline polymers (namely, with a crystallinity above 70%) or to the glass transition temperature in the case of amorphous polymers.

When the non-ionic polymer is a weakly crystalline semi-crystalline polymer (namely, with a crystallinity ranging from 1 to 70%), it has, preferably, a melting temperature below 50° C. and a glass transition temperature above 30° C.

Non-ionic polymers capable of meeting the aforementioned specificities are polymers belonging to the family of polyolefins, styrenic polymers, polymethacrylate polymers, polycarbonate polymers and mixtures thereof.

More precisely, as examples of polyolefins, polypropylenes, polyethylenes and mixtures thereof may be cited.

In particular, as polypropylenes, they may be polypropylenes, linear or branched, and more specifically, atactic polypropylenes, syndiotactic or isotactic polypropylenes.

As polyethylenes, they may be polyethylenes, linear or branched, such as high density polyethylene, low density polyethylene.

It is pointed out that low-density polyethylene is taken to mean a polymer obtained by radical polymerisation of ethylene while operating at very high pressures (for example, 1800 to 3000 bars) at around 200° C. Its density, close to 0.92 $g \cdot cm^{-3}$, is lower than that of high density polyethylene (having a density of the order of 0.95 $g \cdot cm^{-3}$), because its structure has a higher branching level than that of high density polyethylene.

It is pointed out that high density polyethylene is taken to mean a polymer obtained by polymerisation of ethylene having a density of the order of 0.95 $g \cdot cm^{-3}$.

The non-ionic polymer may be comprised in the composition at a concentration ranging from 1 to 95% by weight compared to the total weight of the composition, preferably, from 1 to 50% and, even more preferably, from 5 to 25% by weight compared to the total weight of the composition.

The compositions of the invention may be prepared by a method including a step of polymerisation of the aforementioned ionic liquid, which is comprised in a mixture including, apart from the aforementioned ionic liquid, lithium salt and non-ionic polymer, a polymerisation initiator.

Said mixture may be prepared prior to the step of polymerisation, for example, by the implementation of the following operations:
an operation of bringing the lithium salt into contact with the ionic liquid;
an operation of addition to the mixture obtained of a polymerisation initiator; and
an operation of addition of a non-ionic polymer as defined below.

The polymerisation initiator as mentioned above may be a radical polymerisation initiator, which may be selected from:
peroxypivalate compounds, such as tert-butyl peroxypivalate, t-amyl peroxypivalate;
peroxide compounds, such as di-tert-butyl peroxide, (tert-butylperoxy)-2,5-dimethylhexane and benzoyl peroxide;
persulfate compounds, such as potassium persulfate, sodium persulfate or ammonium persulfate;
azo compounds, such as azobisisobutyronitrile (known by the abbreviation AIBN); and
carbonate compounds, such as bis(4-tert-butyl cyclohexyl) peroxydicarbonate.

Those skilled in the art will choose the operating conditions, particularly in terms of temperature and duration to carry out the polymerisation of the ionic liquid.

By virtue of its intrinsic properties, and notably by virtue of its ionic conduction properties, the compositions are entirely suited to be used as electrolytic membrane of an electrochemical lithium generator and, specifically a lithium accumulator, such as a lithium-metal battery or a lithium-air battery.

It is understood that said membrane, in order to assurer its electrolytic function within an electrochemical lithium generator, will not be electron conducting.

Apart from its electrolytic function, this membrane assures a separating function between the negative electrode and the positive electrode of the electrochemical lithium generator.

It also makes it possible to protect a negative electrode from the harmful effects of water, particularly when said electrode is based on lithium metal or a lithium insertion compound. It is thus perfectly suited for lithium accumulators (in particular, lithium-air batteries), which can function with aqueous electrolytes (acidic or basic).

It may be self-supporting (which implies that it is then at a later stage placed in contact with the negative electrode and the positive electrode of an electrochemical lithium generator) or may be formed directly on one of the electrodes.

Thus, the subject matter of the present invention is also a membrane including a composition as defined above, which membrane is an electrolytic membrane for an electrochemical lithium generator, and preferably, for a lithium accumulator comprising, as negative electrode, a lithium metal based electrode.

The membranes may be prepared in the same way as the aforementioned compositions, on a support, which may be a sheet made of polytetrafluoroethylene, a sheet made of metal such as copper or aluminium.

The membranes may have a thickness ranging, for example, from 0.5 to 1000 µm.

The membranes may have an ionic conductivity comprised between $1*10^{-7}$ S·cm$^{-1}$ and $1*10^{-2}$ S·cm$^{-1}$.

The subject matter of the present invention is also an electrochemical lithium generator, as represented according to a particular embodiment in FIG. 1, said electrochemical generator including at least one cell (referenced 1) including a membrane 3 as defined above arranged between a negative electrode 5 and a positive electrode 7, said negative electrode being, preferably, a lithium metal based electrode.

Said electrochemical lithium generator may be a lithium accumulator, such as a lithium-metal battery or a lithium-air battery. It may be a lithium-ion battery or a lithium-sulphur battery.

When it is a lithium-air battery, the positive electrode is an air electrode, which may include:
- at least one electron conducting material;
- at least one catalyst; and
- potentially, at least one binder to assure cohesion between said material and said catalyst.

The electron conducting material may be, preferably, a carbon material, namely a material including carbon in the elementary state.

The aforementioned catalyst is, from a functional point of view, a catalyst capable of accelerating the electrochemical reactions taking place at the air electrode (whether in discharge or charge process) and, also, capable of increasing the operational voltage at which said electrochemical reactions take place.

To assure cohesion between the electron conducting material and the catalyst, the negative electrode may comprise one or more binders, in particular, one or more polymeric binders.

When it is a lithium-metal battery, the material of the positive electrode may be sulphur, manganese dioxide MnO$_2$, CF$_x$ (or, in other words, fluorinated graphite), SOCl$_2$ or a compound of formula Li$_x$M$_y$(XO$_x$)$_n$ in which:
M represents an element selected from Mn, Fe, Co, Ni, Cu, Mg, Zn, V, Ti, Al, Si, B, Cr, Mo and mixtures thereof;
X represents an element selected from P, Si, Ge, S, V and As;
x, y, z and n are whole numbers or positive decimal numbers chosen such that the total charge of the cations compensates the total charge of the anions, so that the compound is electrically neutral.

Preferably, M represents an element selected from Mn, Fe, Co, Ni, Cu, V, Ti, B, Cr, Mo and mixtures thereof.

To prepare a lithium accumulator as defined above, for example, a lithium-ion, lithium-metal, lithium-sulphur battery, two synthesis pathways may be envisaged:
a first pathway consisting in hot pressing a membrane as defined above between a negative electrode and a positive electrode;
a second pathway consisting in directly forming the membrane as defined above on one of the electrodes and hot pressing the resulting assembly on the other electrode.

To prepare a lithium-air battery, the membrane may be deposited directly on the lithium metal, the resulting assembly then being assembled with the other constituents of the battery (which may be respectively, a current collector for the lithium electrode, a separator impregnated with liquid electrolyte in contact with the membrane, the other electrode and its current collector).

Finally, as mentioned above, the composition of the invention may also be intended to form an electrode-membrane assembly, in which case the composition includes, advantageously, moreover, the necessary ingredients to obtain an electrode.

For example, when the electrode is intended to constitute an electrode of a lithium-ion battery, and more specifically, a positive electrode or a negative electrode, the ingredients may consist in carbon materials, inorganic lithium compounds and for a negative electrode, potentially also graphite or silicon.

As examples of carbon materials, carbon SLP30 or carbon black may be cited.

As examples of inorganic lithium compounds may be cited polyanionic lithium compounds of transition metals, such as lithium compounds responding to the following generic formula:

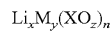

Li$_x$M$_y$(XO$_2$)$_n$ in which:
M represents an element selected from Mn, Fe, Co, Ni, Cu, Mg, Zn, V, Ti, Al, Si, B, Cr, Mo and mixtures thereof;
X represents an element selected from P, Si, Ge, S, V and As;
x, y, z and n are whole numbers or positive decimal numbers chosen such that the total charge of the cations compensates the total charge of the anions, so that the compound is electrically neutral.

Preferably, M represents an element selected from Mn, Fe, Co, Ni, Cu, V, Ti, B, Cr, Mo and mixtures thereof.

More precisely, such compounds may correspond to the case where X corresponds to the element phosphorous P, in which case these compounds constitute lithium phosphate compounds. Such compounds may be, for example, LiFePO$_4$ or Li$_3$V$_2$(PO$_4$)$_3$.

Thus, the aim of the invention is also an electrode-membrane assembly including such a composition as well as an electrochemical lithium generator including at least one cell including such an assembly.

The invention will now be described, with reference to the following examples, given by way of illustration and in no way limiting.

Figure 1:
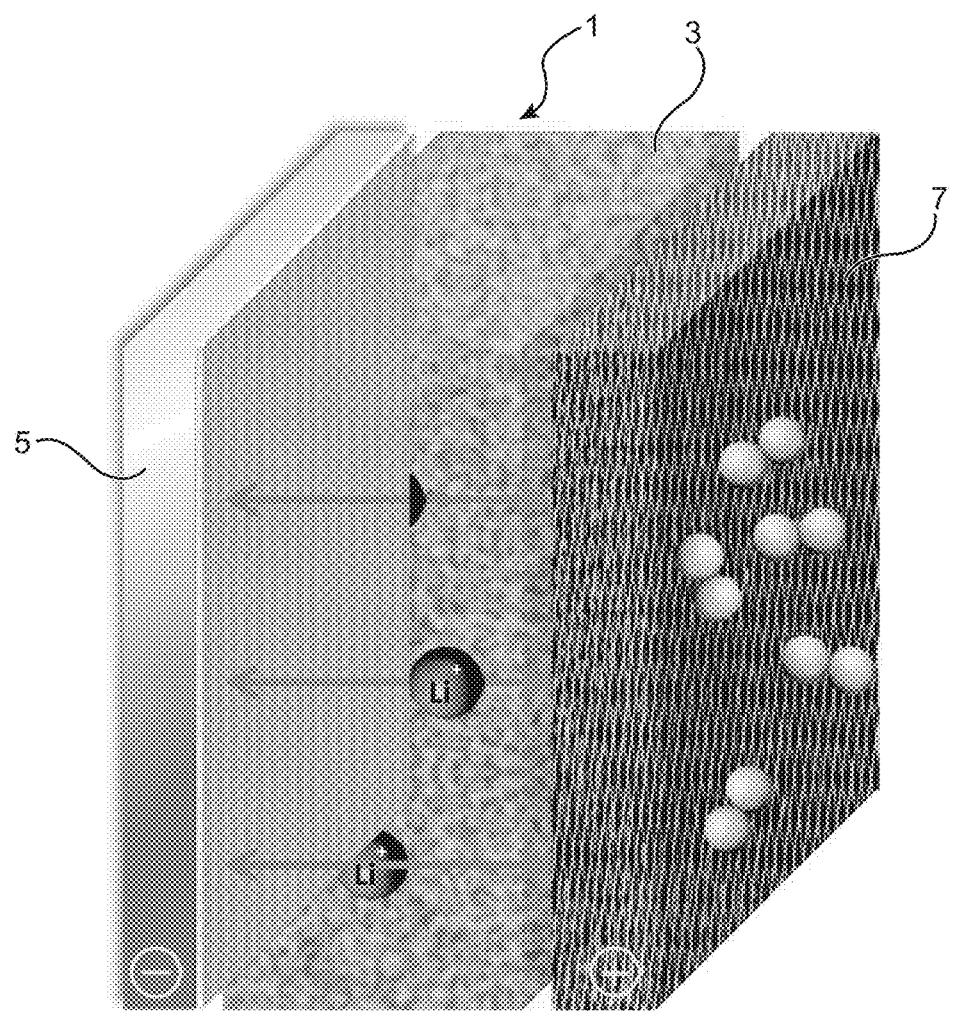
FIG. 1 is a transversal sectional view of a battery according to the invention.

and in discharge (curve b) as a function of the number of cycles N for a single cell battery produced according to example 4.

DETAILED DESCRIPTION OF PARTICULAR EMBODIMENTS

Example 1

The present example illustrates the preparation of a self-supporting flexible lithium ion conducting membrane.

All of the steps constituting the preparation of the membrane are carried out in a glove box.

Firstly, amorphous polypropylene (0.5 g), having a weight average molecular weight $M_w$ of 14000 and a number average molecular weight $M_n$ of 3700, is mixed with toluene (0.5 g) in a first glass container. The resulting mixture is heated to 90° C. and is mixed for 48 hours until a homogeneous mixture is obtained. Lithium bis(trifluoromethanesulfonyl)imide (symbolised by the abbreviation LiTFSI) constituting a lithium salt (193.5 mg) is added in a second glass container to 300 mg of tetrahydrofuran (THF). To the latter is added 1 g of ionic liquid (symbolised by the abbreviation IL) N,N,N,N-n-butyldimethylmethacryloyloxyethylammonium (bis(trifluoromethanesulfonyl)imide) (Molar mass: 494.48 g/mol) (the molar ratio LiTFSI/IL being 25:75) and mixed using a magnetic stirrer for 15 minutes at 800 rpm. The resulting solution is poured into the first glass container then the resulting mixture is stirred vigorously using the magnetic stirrer for 30 minutes. At the end of these 30 minutes, azobisisobutyronitrile (symbolised by the abbreviation AIBN) is added according to a proportion of 2% by weight compared to the weight of the aforementioned ionic liquid (i.e. 20 mg of AIBN). Once the addition of AIBN is completed, the mixture is again stirred up to complete dissolution of the AIBN. Then, the mixture is spread coated using a doctor blade adjusted to a height of 200 μm on a polytetrafluoroethylene sheet. After spread coating, the sheet is placed at 60° C. for 24 hours then 3 hours under vacuum again at 60° C. A self-supporting membrane capable of conducting lithium ions is thereby obtained. In addition, thanks to the addition of polypropylene, the membrane is watertight.

In a variant, the final step of spread coating may be carried out on a sheet of PTFE, on which is placed a sheet of lithium (2*2 cm$^2$) having a thickness of 135 μm), the resulting membrane having a thickness of 55 μm.

Example 2

The membrane obtained according to example 1 is subjected to tests to determine the ionic conductivity thereof with a view to evaluating its performances.

To do so, a disc of 14 mm is cut out, in the membrane, using a punch.

After having measured the thickness of the membrane with a Palmer micrometer, the disc is placed between 4 steel wedges, which are themselves inserted into a button cell battery (Cell battery CR2032). A spring is placed between one of the covers of the cell battery and one of the wedges to assure optimal contact of the membrane between the two wedges. Said button cell battery is elaborated with a view to carrying out impedance spectroscopy measurements of the membrane.

The impedance spectroscopy measurements are carried out with a Biologic VMP3 potentiostat at a voltage of 20 mV and by varying the frequencies from 1 MHz to 100 mHz with 11 points per decade. The measurements are carried out at different temperatures then a graph is plotted illustrating the variation in conductivity as a function of the inverse of temperature.

Figure 2A:
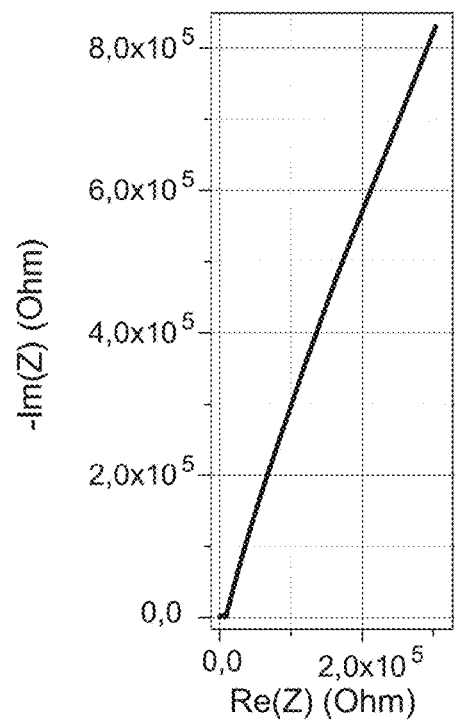
FIGS. 2a and 2b are two graphs illustrating the evolution of the impedance at 35° C. for the membrane prepared according to example 2.
Figure 2B:
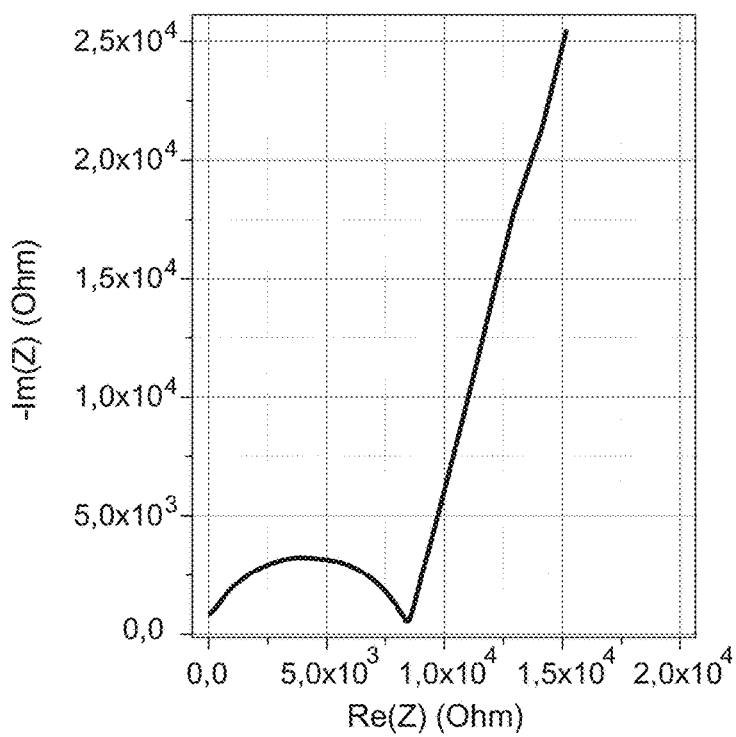

FIGS. 2a and 2b (FIG. 2b being an enlarged view of part of FIG. 2a) represents a Nyquist diagram obtained for the temperature of 35° C., the Y-axis −lm(Z) (in Ohms) corresponding to the absolute value of the imaginary part of the impedance and the X-axis Re(Z) (in Ohms) corresponding to the real part of the impedance. From this diagram, it is possible to extract the conductivity value at 35° C.

Figure 3:
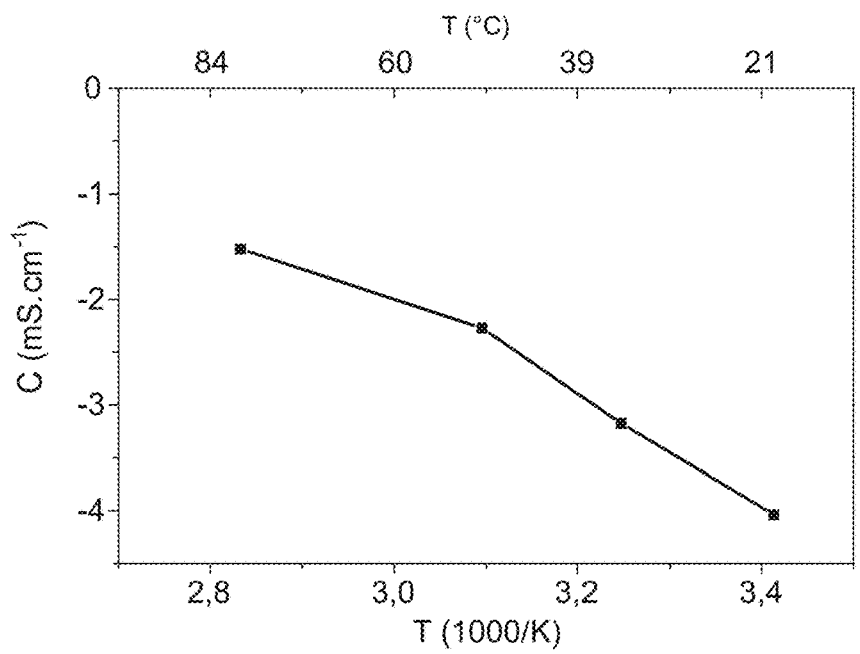
FIG. 3 is a graph illustrating the evolution of the ionic conductivity C (in mS·cm$^{-1}$) as a function of temperature T (1000/K for the lower abscissa) or (° C. for the upper abscissa) for the membrane prepared according to the example 2.

The operation was reiterated at several temperatures, the result of the conductivities obtained being reported in FIG. 3, which illustrates the evolution of conductivity as a function of the inverse of temperature. From this figure, it ensues, particularly, that, for a temperature of 80° C., the conductivity obtained is $5*10^{-2}$ mS/cm.

Example 3

The objective of this example is to demonstrate the lithium ion conducting capacity of an ionic polymer being able to be used in the compositions of the invention.

To do so, initially, a half-cell battery is prepared including a positive electrode based on graphite and a polymeric binder including a non-ionic polymer capable of entering into the compositions of the invention and including, moreover, an electrolytic membrane according to the invention deposited on one face of the positive electrode.

All of the steps constituting the preparation of the aforementioned half-cell battery are carried out in a glove box.

Firstly, 1 g of carbon SLP30 is weighed out in a first glass container.

Secondly, lithium bis(trifluoromethanesulfonyl)imide (symbolised by the abbreviation LiTFSI) constituting a lithium salt (193 mg) is added in a second glass container to 300 mg of tetrahydrofuran (THF). After stirring for several minutes at 400 rpm, 1 g of ionic liquid (symbolised by the abbreviation IL) N,N,N,N-n-butyldimethylmethacryloyloxyethylammonium (bis(trifluoromethanesulfonyl)imide) (Molar mass: 494.48 g/mol) is added to this mixture than mixed using a magnetic stirrer for 5 minutes at 400 rpm. Thus, the molar ratio LiTFSI/IL is 25:75. At the final moment, azobisisobutyronitrile is added (symbolised by the abbreviation AiBN) according to a proportion of 2% by weight compared to the weight of the aforementioned ionic liquid (i.e. 20 mg of AiBN). Once the addition of AiBN is completed, the mixture is again stirred up to complete dissolution of the AiBN. The contents of the first container and the second container are then combined, with an addition of 1 g of THF to facilitate mixing and spread coating. Thus, the molar percentage of carbon SLP30:IL is 45:55. The whole is mixed using a spatula. Then, the mixture is spread coated using a doctor blade adjusted to a height of 200 μm on a sheet of copper. After spread coating, the sheet is placed at 60° C. for 24 hours.

The membrane of the invention is then deposited on the positive electrode by spread coating with a doctor blade over a height of 50 μm in the same conditions as in example 1, only that this time the support is the positive electrode.

From the resulting assembly, a pellet of 14 mm is cut out using a punch then a cell battery is assembled in the following manner.

A lithium metal pellet is placed on the pellet cut out beforehand and is arranged in a button cell battery of type CR2032.

The cell battery thereby obtained is subjected to cycling tests with a current of 100 µA with an Arbin potentiostat having placed the button cell battery beforehand in a climatic chamber at 80° C.

Figure 4:
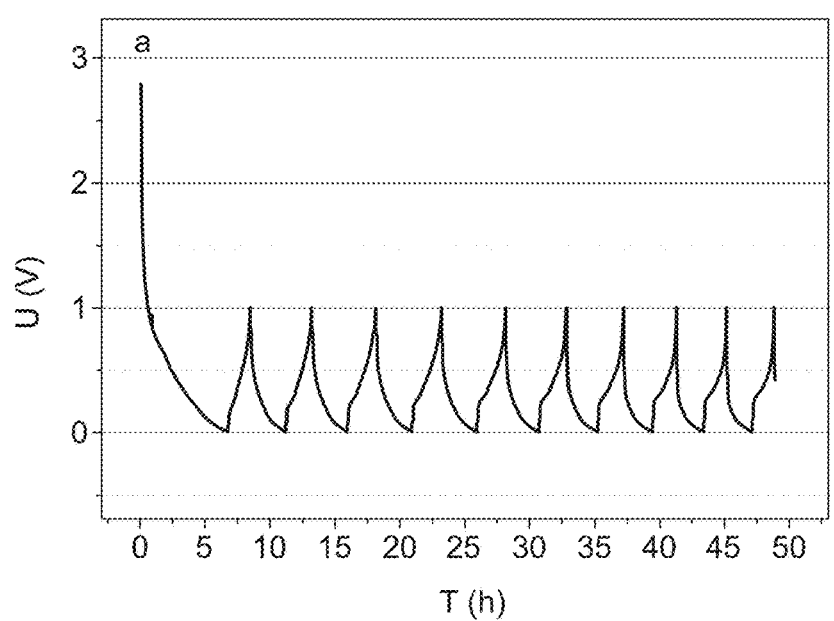
FIG. 4 is a graph illustrating the curves of cyclings U (in V) as a function of time T (in hours) for a single cell battery produced according to example 3.
Figure 5:
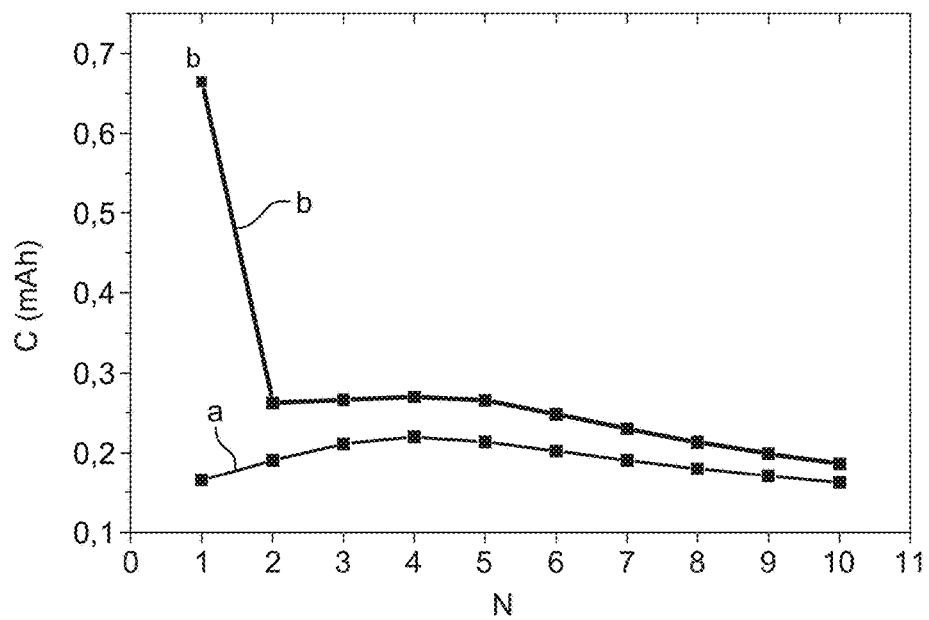
FIG. 5 is a graph illustrating the curves showing the evolution of the capacitance C (in mAh) in charge (curve a) and in discharge (curve b) as a function of the number of cycles N for a single cell battery produced according to example 3.

The curves of voltage as a function of time as well as the capacitances in charge and discharge as a function of the number of cycles may be seen in appended FIGS. 4 and 5.

From FIG. 4 it may be noted that the battery cycles over at least 10 cycles and from FIG. 5, that, after a loss of capacitance during the first charge, said capacitance stabilises rapidly.

Example 4

The objective of this example is to demonstrate the lithium ion conducting capacity of an ionic polymer being able to be used in the compositions of the invention.

To do so, initially, a half-cell battery is prepared including a positive electrode based on $LiFePO_4$ and a polymeric binder including a non-ionic polymer capable of entering into the compositions of the invention and including, moreover, an electrolytic membrane according to the invention deposited on one face of the positive electrode.

All of the steps constituting the preparation of the aforementioned half-cell battery are carried out in a glove box.

Firstly, 0.9 g of $LiFePO_4$ (symbolised hereafter LFP) is weighed out, in a first glass container, with 0.1 g of carbon black. The mixture is ground with a mortar and pestle with 2 g of cyclohexane. It is recovered in the first glass container, once the cyclohexane has completely evaporated.

Secondly, lithium bis(trifluoromethanesulfonyl)imide (symbolised by the abbreviation LiTFSI) constituting a lithium salt (193 mg) is added in a second glass container to 300 mg of tetrahydrofuran (THF). After stirring for several minutes at 400 rpm, 1 g of ionic liquid (symbolised by the abbreviation IL) N,N,N,N-butyldimethylmethacryloyloxyethylammonium (bis(trifluoromethanesulfonyl)imide) (Molar mass: 494.48 g/mol) is added to this mixture then mixed using a magnetic stirrer for 5 minutes at 400 rpm. Thus, the molar ratio LiTFSI/IL is 25:75. At the final moment, azobisisobutyronitrile (symbolised by the abbreviation AiBN) is added according to a proportion of 2% by weight compared to the weight of aforementioned ionic liquid (i.e. 20 mg of AiBN). Once the addition of AiBN is completed, the mixture is again stirred up to complete dissolution of the AiBN. The contents of the first and second containers are then combined, with an addition of 1 g of THF to facilitate mixing and spread coating. Thus, the molar percentage of carbon LFP:IL is 47:53. The whole is mixed using a spatula. Then, the mixture is spread coated using a doctor blade adjusted to a height of 200 µm on a sheet of aluminium. After spread coating, the sheet is placed at 60° C. for 24 hours.

The membrane of the invention is then deposited on the positive electrode by spread coating with a doctor blade over a height of 50 µm in the same conditions as in example 1, only that this time the support is the positive electrode.

From the resulting assembly, a pellet of 14 mm is cut out using a punch then a cell battery is assembled in the following manner.

The cell battery thereby obtained is subjected to cycling tests with a current of 100 µA with an Arbin potentiostat having placed the button cell battery beforehand in a climatic chamber at 80° C.

Figure 6:
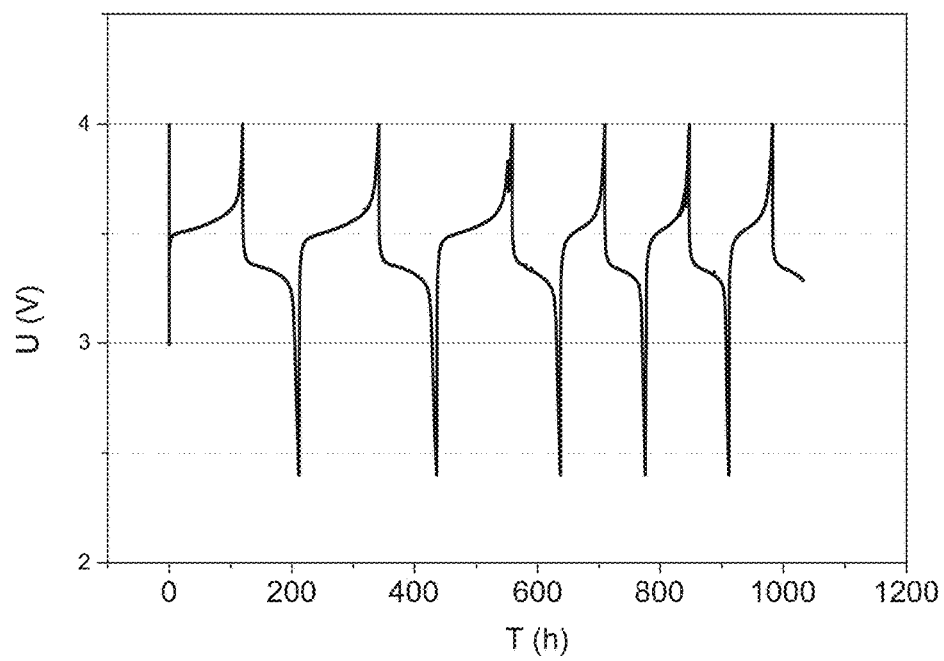
FIG. 6 is a graph illustrating the curves of cyclings U (in V) as a function of time T (in hours) for a single cell battery produced according to example 4.
Figure 7:
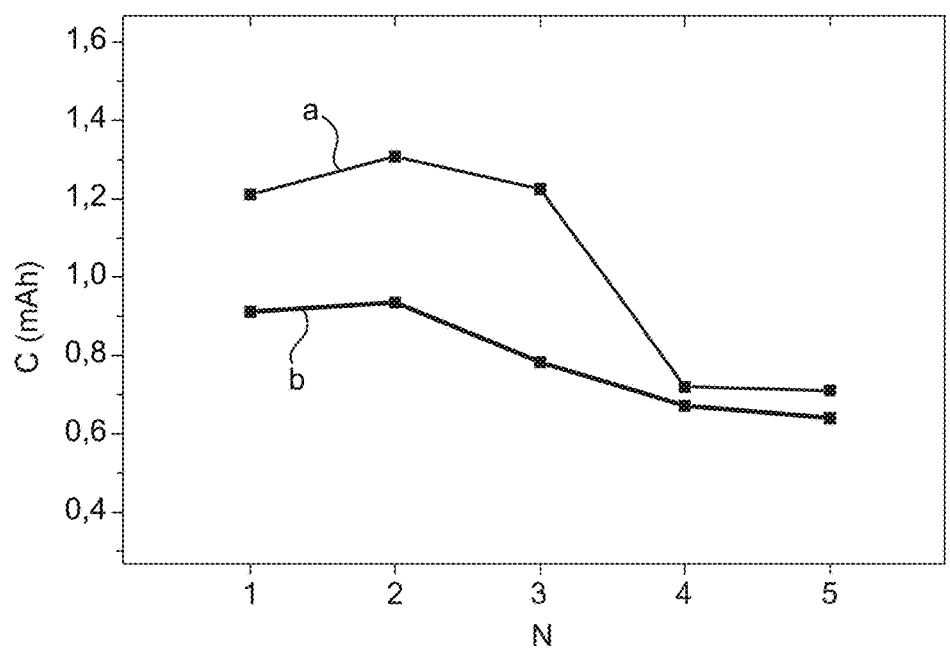
FIG. 7 is a graph illustrating the curves showing the evolution of the capacitance C (in mAh) in charge (curve a)

The curves of voltage as a function of time as well as the capacitances in charge and discharge as a function of the number of cycles may be seen in appended FIGS. 6 and 7.

From FIG. 6 it may be noted that the battery cycles over at least 10 cycles.

From FIG. 7 it may be noted that the capacitance is stabilised from the 4th cycle. What is more, the ratio between discharge and charge is greater than 90% from the 4th cycle.

The invention claimed is:

1. A polymer composition that conducts lithium ions including the following ingredients:
   at least one ionic polymer from the polymerisation of an ionic liquid, the cation of which bears at least one polymerisable function;
   at least one lithium salt; and
   at least one non-ionic polymer,
   said composition being a solid composition devoid of water and organic solvent(s).

2. A polymer composition according to claim 1, wherein the lithium salt is selected from the group constituted of $LiPF_6$, $LiClO_4$, $LiBF_4$, $LiAsF_6$, $LiCF_3SO_3$, lithium bis(trifluoromethanesulfonyl)imide $LiN[SO_2CF_3]_2$, bis(pentafluoroethanesulfonyl)imide $LiN(C_2F_5SO_2)_2$ and mixtures thereof.

3. A polymer composition according to claim 1, wherein the lithium salt is present in a concentration ranging from 0.05 to 5M.

4. A polymer composition according to claim 1, wherein the polymerisable function is a function polymerisable by radical pathway.

5. A polymer composition according to claim 1, wherein the polymerisable function is selected from vinylic groups.

6. A polymer composition according to claim 1, wherein the cation is a compound comprising at least one nitrogen atom, at least one phosphorous atom or at least one sulfur atom, the positive charge of which is borne by said nitrogen atom, said phosphorous atom or said sulfur atom, said atom being able to belong to a linear or branched hydrocarbon chain or to a hydrocarbon ring.

7. A polymer composition according to claim 6, wherein when the positively charged nitrogen atom belongs to a linear or branched hydrocarbon chain, the cation is an aliphatic ammonium cation corresponding to the following generic formula (II):

wherein $R^1$, $R^2$, $R^3$ and $R^4$ represent, independently of each other, a hydrocarbon group, with at least one of the groups $R^1$, $R^2$, $R^3$ and $R^4$ being a hydrocarbon group bearing at least one polymerisable function.

8. A polymer composition according to claim 1, wherein the cation is a cation of following formula (V):

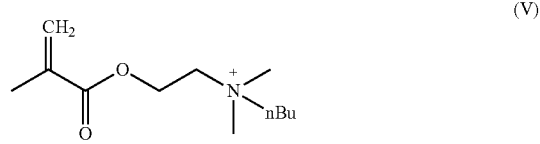

nBu corresponding to the n-butyl group.

9. A polymer composition according to claim 1, wherein the anion is a compound including a heteroatom bearing a negative charge, said heteroatom being selected from a nitrogen atom, a boron atom, a phosphorous atom or a chlorine atom.

10. A polymer composition according to claim 1, wherein the anion is an amide compound.

11. A polymer composition according to claim 1, wherein the anion is a bis(trifluoromethylsulfonyl)amide compound of following formula (XI):

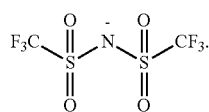

(XI)

12. A polymer composition according to claim 1, wherein the ionic liquid is an ionic liquid resulting from the association:
of a cation of following formula (V):

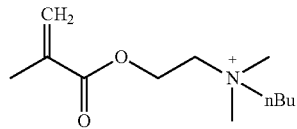

(V)

and
of an anion of following formula (XI):

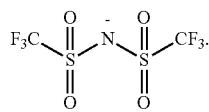

(XI)

13. A polymer composition according to claim 1, wherein the non-ionic polymer is selected from polyolefins, styrenic polymers, polymethacrylate polymers, polycarbonate polymers and mixtures thereof.

14. A polymer composition according to claim 13, wherein the non-ionic polymer, when it belongs to the family of polyolefins, is selected from polypropylenes, polyethylenes and mixtures thereof.

15. A polymer composition according to claim 1, wherein the non-ionic polymer is comprised in the composition at a concentration ranging from 1 to 95% by weight compared to the total weight of the composition.

16. A polymer composition according to claim 1, further comprising ingredients necessary for the formation of an electrode.

17. A method for preparing a conducting polymer composition that conducts lithium ions, said polymer composition including the following ingredients:
at least one ionic polymer from the polymerisation of an ionic liquid, the cation of which bears at least one polymerisable function;
at least one lithium salt; and
at least one non-ionic polymer;
said method comprising polymerization of the ionic liquid, which is comprised in a mixture including lithium salt, and non-ionic polymer, and a polymerisation initiator; and
said composition being a solid composition devoid of water and organic solvent(s).

18. A membrane including a polymer composition as defined in claim 1.

19. A membrane according to claim 18, which is an electrolytic membrane for electrochemical lithium generator.

20. An electrochemical lithium generator including at least one cell including a membrane as defined according to claim 18, said membrane being arranged between a negative electrode and a positive electrode.

21. An electrochemical lithium generator according to claim 20, in which the negative electrode is a lithium metal based electrode.

22. An electrochemical lithium generator according to claim 20, which is a lithium-metal battery or a lithium-air battery.

23. An electrode-membrane assembly including a polymer composition according to claim 1, said polymer composition further comprising ingredients necessary for the formation of an electrode.

24. An electrochemical lithium generator including at least one cell including an electrode-membrane assembly as defined in claim 23.

* * * * *